United States Patent [19]
Kuno et al.

[11] 4,379,366
[45] Apr. 12, 1983

[54] DIRECTION FINDING SYSTEM

[75] Inventors: Akira Kuno, Oobu; Muneaki Matsumoto, Okazaki; Koji Numata, Toyokawa, all of Japan

[73] Assignee: Nippon Soken, Inc., Nishio, Japan

[21] Appl. No.: 257,137

[22] Filed: Apr. 24, 1981

[30] Foreign Application Priority Data

Apr. 25, 1980 [JP] Japan ................................ 55-55863

[51] Int. Cl.³ ............................................. G01C 17/30
[52] U.S. Cl. .................................... 33/361; 33/363 R
[58] Field of Search ................. 33/348, 356, 361, 362, 33/363 R, 363 L, 363 Q

[56] References Cited

U.S. PATENT DOCUMENTS

| | | | |
|---|---|---|---|
| 3,744,312 | 7/1973 | Anderson | 33/356 |
| 3,905,121 | 9/1975 | Takeda et al. | 33/361 |
| 3,959,889 | 6/1976 | Thomas | 33/361 |
| 4,139,949 | 2/1979 | Goldman | 33/348 |

FOREIGN PATENT DOCUMENTS

| | | | |
|---|---|---|---|
| 49-123358 | 11/1974 | Japan . | |
| 55-143406 | 11/1980 | Japan | 33/363 R |
| 495528 | 12/1975 | U.S.S.R. | 33/361 |

Primary Examiner—Richard R. Stearns
Attorney, Agent, or Firm—Cushman, Darby & Cushman

[57] ABSTRACT

A direction finding system of the type finding a present direction on 4N direction divisions defined by 2N boundary levels for automotive vehicles, said system comprising a magnetic sensor circuit for generating a pair of electric signals indicating two perpendicular components of the earth's magnetic field, a logic circuit for signal-converting the electric signals, discriminating and latching to generate direction indicating 2N binary signals with reference to predetermined 2N boundary indicating levels, a sorting circuit for sorting the binary signals to generate one of 4N direction signals and a display device for displaying a corresponding direction.

9 Claims, 5 Drawing Figures

4,379,366

DIRECTION FINDING SYSTEM

BACKGROUND OF THE INVENTION

This invention relates to direction finding systems for generating a direction signal specifying the direction of progress of a vehicle or the like.

As for the prior art system of this sort, Japanese Patent Disclosure No. 123358/1974 discloses a "direction finding system", in which two different electric signals obtained from a magnetic-sensing element are compared in a comparator with two respective reference voltages, and the output signals from the comparator are appropriately combined in a logic circuit to produce eight different patterns to provide a direction signal as the output signal of the logic circuit.

In the system, however, since the two electric signals from the magnetic-sensing element are compared with the respective two reference voltages, if the pair of electric signals from the magnetic-sensing element are abnormally increased due to disturbance of the external magnetic field by external environments, uniformity of 4N heading or bearing divisions specified by the outputs of the logic circuit is lost, and unbalance of the adjacent two bearing divisions, for instance adjacent bearing divisions for specifying the "North" and "North West" directions respectively, occurs in proportion to the extent to which the two electric signals from the magnetic-sensing element are abnormal.

SUMMARY OF THE INVENTION

With a view to overcoming the foregoing deficiencies in the prior art, it is the object of the present invention to provide a direction finding system, in which two different electric signals obtained from a direction-finding sensor are converted into 2N binary signals specifying one of the bearing divisions corresponding to respective 4N directions through a level discrimination of the two electric signals to provide the 2N binary signals as a direction signal, whereby a direction signal accurately specifying the direction can be provided irrespective of the magnitude of the external magnetic field.

DESCRIPTION OF THE PREFERRED EMBODIMENT

Now, a preferred embodiment of the invention will be described with reference to the drawings.

Figure 1:
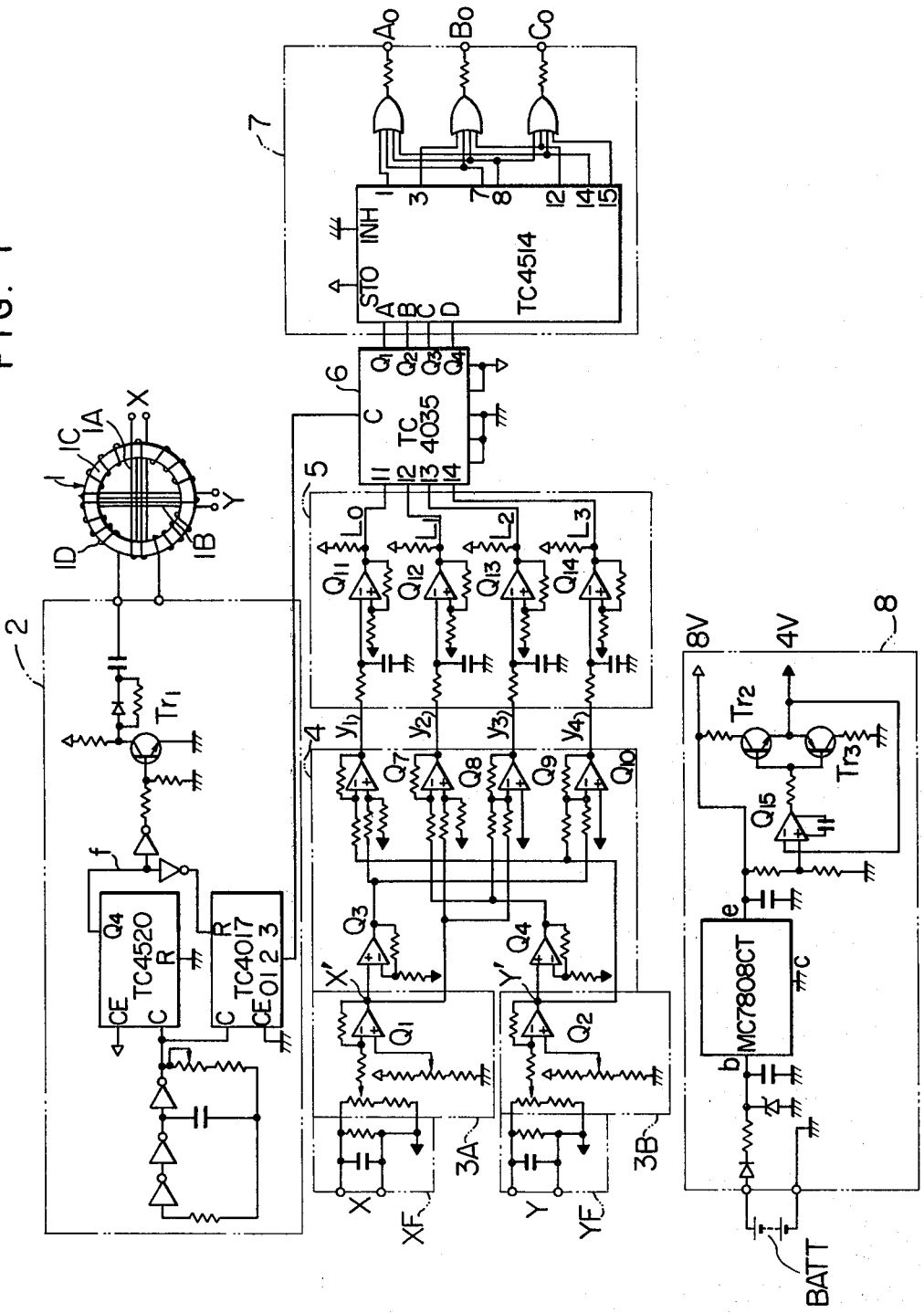
FIG. 1 is a circuit diagram showing an embodiment of the invention.

FIG. 1 is an electrical connection diagram showing one embodiment. A direction-finding sensor 1 includes a magnetic core 1C of ferromagnetic material on which are wound an excitation winding 1D and output windings 1A and 1B which are wound to cross each other at right angles. Reference numeral 2 designates an oscillator circuit to excite the excitation winding 1D at a frequency f [as shown by (1) in FIG. 2]. The magnetic field in the core 1C varies with the strength H of the horizontal component of the earth's magnetic field, and outputs X and Y [by (2) and (3) in FIG. 2] are generated from the output windings 1A and 1B in proportion to the strength H. The outputs X and Y of the output windings 1A and 1B vary in dependence upon the direction of the direction-finding sensor, i.e., the direction of progress of a vehicle or the like, so the outputs X and Y are coupled through tuning circuits XF and YF, the outputs of which are amplified through respective amplifiers 3A and 3B such that their maximum values are equal to each other. The amplified outputs X' and Y' are coupled to a function generator, e.g., logic circuit 4. The logic circuit 4 includes operational amplifiers $Q_3$ and $Q_4$ for producing the value of tan 67.5°, operational amplifiers $Q_7$ and $Q_8$ constituting a subtractor and operational amplifiers $Q_9$ and $Q_{10}$ constituting an adder, and it converts the outputs X' and Y' of the amplifying circuits 3A and 3B according to equations $y_1 = Y' - (\tan 67.5°)X'$, $y_2 = (\tan 67.5°)Y' - X'$, $y_3 = (\tan 67.5°)Y' + X'$ and $y_4 = -Y' + (\tan 67.5°)X'$ to obtain outputs $y_1$, $y_2$, $y_3$ and $y_4$ which are coupled to a discriminating circuit 5. The discriminating circuit 5 includes comparators $Q_{11}$, $Q_{12}$, $Q_{13}$ and $Q_{14}$ which discriminate whether the respective outputs $y_1$, $y_2$, $y_3$ and $y_4$ of the logic circuit 4 are positive or negative (i.e., "1" or "0"). The discriminated values are latched as a direction signal in a latch circuit 6 according to a signal C [(4) in FIG. 2] from the oscillating circuit 2. The circuits 5 and 6 form a signal converting circuit.

Figure 2:
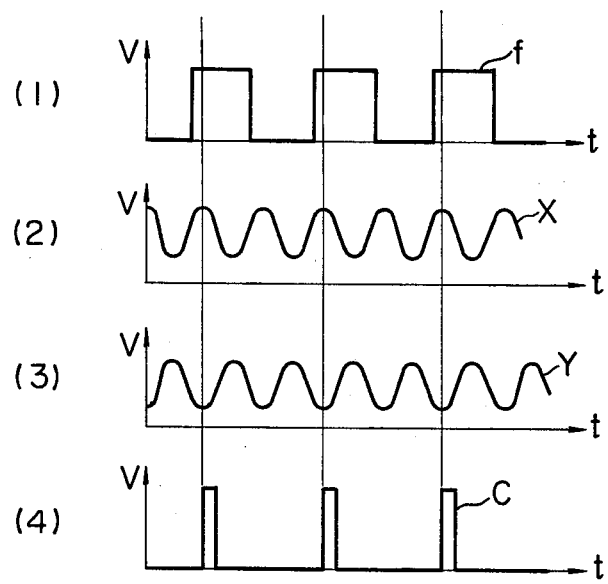
FIG. 2 shows signal waveforms for explaining the operation according to the invention.
Figure 3:
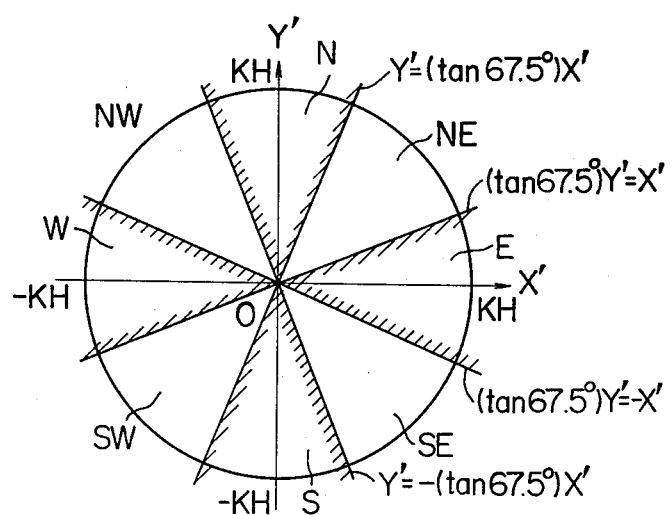
FIG. 3 is a view illustrating the principle of the operation according to the invention.

If the direction-finding sensor 1 is rotated through 360 degrees, the voltage values of the output signals X' and Y' at the rising point of a signal C from the amplifying circuits 3A and 3B as shown in FIG. 2, describe a circle of a radius (kH (volt) where k is a constant) which is proportional to the strength H of the horizontal component of the earth's magnetism as shown in FIG. 3. Considering a case where eight bearing divisions (N=2) are digitally displayed, each division corresponds to 360°/8=45°, the eight bearing divisions N, NE, E, SE, S, SW, W and NW are defined by four straight lines passing through the origin 0 given respectively as $Y' = (\tan 67.5°)X'$, $(\tan 67.5°)Y' = X'$, $(\tan 67.5°)Y' = -X'$ and $Y' = (\tan 67.5°)X'$. Thus, the eight bearing divisions are digitally displayed by the positive or negative sign of the outputs $y_1 = Y' - (\tan 67.5°)X'$, $y_2 = (\tan 67.5°)Y' - X'$, $y_3 = (\tan 67.5°)Y' + X'$ and $y_4 = -Y' + (\tan 67.5°)X'$ previously mentioned, i.e., by the corresponding outputs of $Q_1$ to $Q_4$ of "0" or "1" provided from the latch circuit 6, and the direction of the progress of the vehicle or the like are absolutely represented as in Table 1. When $y_1$, $y_2$, $y_3$ and $y_4$ are positive, the outputs $Q_1$ to $Q_4$ are "0", and otherwise they are "1".

TABLE 1

| | | $Q_1$ | | | |
|---|---|---|---|---|---|
| | | 0 | 1 | 0 | 1 |
| | | | $Q_2$ | | |
| $Q_3$ | $Q_4$ | 0 | 0 | 1 | 1 |
| 0 | 0 | N | NE | | E |
| 1 | 0 | SE | | | |
| 0 | 1 | NW | | | |
| 1 | 1 | W | | SW | S |

For example, if $y_1$ and $y_2$ are both negative and $y_3$ and $y_4$ are both positive, $Q_1$ and $Q_2$ are both "1" and $Q_3$ and $Q_4$ are both "0", and the direction is "E" (East). The sorting circuit 7 logically processes the outputs $Q_1$ to $Q_4$ of the latch circuit 6 to provide outputs $A_0$, $B_0$ and $C_0$ as shown in FIG. 2.

TABLE 2

| Output | Direction | | | | | | | |
|---|---|---|---|---|---|---|---|---|
| | N | NE | E | SE | S | SW | W | NW |
| $A_0$ | 0 | 1 | 0 | 1 | 0 | 1 | 0 | 1 |
| $B_0$ | 0 | 0 | 1 | 1 | 0 | 0 | 1 | 1 |
| $C_0$ | 0 | 0 | 0 | 0 | 1 | 1 | 1 | 1 |

Figure 4:
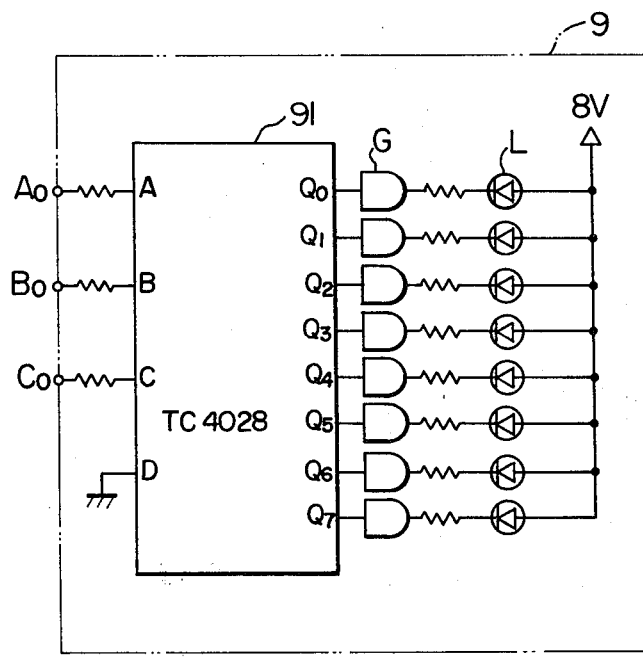
FIG. 4 is a circuit diagram showing a display section.

These three output signals are transmitted to a display section 9 as shown in FIG. 4, whereby each heading is displayed after re-sorting.

Figure 5:
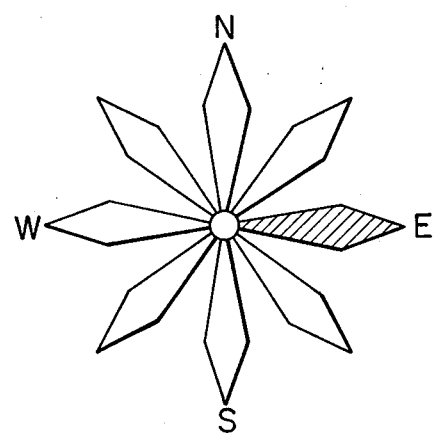
FIG. 5 is a view showing the arrangement of light-emitting diodes installed in the display section.

Reference numeral 8 in FIG. 1 designates the power supply circuit which produces constant voltages of 8 V (shown by white arrow mark in FIGS. 1 and 4) and 4 V (shown by black arrow mark in FIG. 1) from a battery BATT mounted in the vehicle and supplies these voltages to each circuit. For the operational amplifiers $Q_1$, $Q_2$, $Q_3$, $Q_4$, $Q_7$, $Q_8$, $Q_9$ and $Q_{10}$ "CA3240E" by RCA Corporation is used, for the comparators $Q_{11}$, $Q_{12}$, $Q_{13}$ and $Q_{14}$ "MC3302" by Motorola, Inc. is used, and for $Q_{15}$ in the power supply circuit 8 "3140AT" by RCA Corporation is used. In FIG. 4, reference numeral 91 designates a decoder ("TC4028" by Toshiba) in which one of outputs $Q_0$ to $Q_7$ becomes "1" according to whether the input combination ($A_0$, $B_0$, $C_0$) is (0, 0, 0), (1, 0, 0), (0, 1, 0), (1, 1, 0), (0, 0, 1), (1, 0, 1), (0, 1, 1) or (1, 1, 1). These outputs $Q_0$ to $Q_7$ are coupled respectively through gates G ("TC 40107" by Toshiba) and resistors to light-emitting diodes L. The light-emitting diodes L are radially arranged on a compartment instrument panel as shown in FIG. 5, and the direction of progress of the vehicle or the like is indicated by a lighted arrow (the display state in FIG. 5 indicating that the vehicle or the like is proceeding toward the East).

While in the above embodiment the outputs X' and Y' of the amplifying circuits 3A and 3B are converted in the logic circuit 4 according to the formulas $y_1 = Y' = (-\tan 67.5°)X'$, $y_2 = (\tan 67.5°)Y' - X'$, $y_3 = (\tan 67.5°)Y' + X'$ and $y_4 = Y' + (\tan 67.5°)X'$ to produce $y_1$ to $y_4$ for discrimination in the discriminating circuit 5, it is also possible to first produce $Y'/X'$ from the outputs X' and Y' of the amplifying ciruits 3A and 3B in a division circuit, compare the $Y'/X'$ thus obtained with $\tan 67.5°$, $(1/\tan 67.5°)$, $-(1/\tan 67.5°)$ and $-\tan 67.5°$, and couple the result of comparison to the latch circuit 6.

Also, the same effects can be obtained by using equations $y_1' = (\tan 22.5°)Y' - X'$, $y_2' = Y' - (\tan 22.5°)X'$, $y_3' = Y' + (\tan 22.5°)X'$ and $y_4' = (\tan 22.5°)Y' + X'$ instead of $y_1$ to $y_4$. In this case, the operational amplifiers $Q_3$ and $Q_4$ are unnecessary, and since $\tan 22.5°$ has a value less than unity, the terms $(\tan 22.5°)X'$ and $(\tan 22.5°)Y'$ can be produced by reducing the voltages X' and Y' through voltage dividing resistors.

Further, while in the above embodiment eight bearing divisions are provided for the digital display, in case of providing 16 bearing divisions (N=4) the sorting can be made through discrimination with respect to eight formulas, namely $y_1 = Y' - (\tan 78.75°)X'$, $y_2 = Y' - (\tan 56.25°)X'$, $y_3 = (\tan 56.25°)Y' - X'$, $y_4 = (\tan 78.75°)Y' - X'$, $y_5 = (\tan 78.75°)Y' + X'$, $y_6 = (\tan 56.25°)Y' + X'$, $y_7 = (\tan 56.25°)Y' + X'$ and $y_8 = (\tan 78.75°)Y' + X'$. In general, in case of providing 4N bearing divisions (N=1, 2, . . . ) for the digital display, the sorting can be made with respect to 2N formulas.

The above boundary equations or formulas for 4N bearing divisions are generally given by the following equation:

$$y_k = \tan\left(\frac{360°}{8N} + \frac{360°}{4N}(k-1)\right) Y' - X'$$

$$(k = 1 \ldots 2N)$$

The foregoing first to third exemplified equations are those obtained from the above general equation and in the case of the eight bearing divisions (N=2) (through a transformation to bring their numerical coefficients close to each other as much as possible). The fourth exemplified formula are those obtained from the general equation in the case of the sixteen bearing divisions (N=4).

Further, while the logic circuit 4 has been shown to produce the formulas analog-wise, it is also possible to form the formulas digitally using a microcomputor or the like.

Further, while the light-emitting diodes L have been used for the digital display in the display section 9, it is also possible to use fluorescent display tubes, lamps, liquid crystal, etc. or, as a further alternative, display the direction by a symbol display.

Further, it is possible to display the direction by driving a pulse motor according to the outputs $Q_1$ to $Q_4$ of the latch circuit 6.

Further, it is possible to use the outputs $Q_1$ to $Q_4$ of the latch circuit 6 not for the display of the direction but for other purposes, for instance as information for a driving position display system for displaying the present driving position.

Moreover, while a direction-finding sensor of the ring core type has been shown, it is also possible to use sensors of other types, for instance a flux gate sensor and a hole element.

As has been described in the foregoing, since according to the invention two different electric signals obtained from a direction-finding sensor are converted into 2N binary signals specifying one of the bearing divisions corresponding to respective 4N directions through the level discrimination of the two electric signals to provide the 2N binary signals as a direction signal with respect to 2N boundary levels which angularly define the 4N direction divisions, even if the external magnetic field is disturbed by the external environments the uniformity of adjacent two bearing divisions can be maintained by virtue of the angular selection of the bearing divisions corresponding to the 4N directions. Thus, the direction signal which accurately specifies the direction can be provided regardless of the magnitude of the external magnetic field. Besides, since the direction signal is provided as 2N binary signals, it is particularly suited for the digital processing to specify the direction.

We claim:

1. A direction finding system comprising:
a terrestrial magnetism sensor for detecting two perpendicular components of the direction of the earth's magnetic field and generating two electric signals corresponding to the detected components; and electronic means for generating a direction signal specifying one of 4N, where N is a positive integer, directions in accordance with the two electric signals from said terrestrial magnetism sensor, said electronic means producing 2N radialized boundaries representing signal components from said two electric signals to define 4N radialized regions, said electronic means including means for discriminating the signal components to discriminate to which region of said radialized regions said direction of the earth's magnetic field corresponds, and said electronic means including means for generating binary signals to specify the corresponding one region in dependence upon the discrimination of levels of said signal components.

2. A direction finding system according to claim 1, which further comprises circuit means for converting said two electric signals into a pair of direction signals (X', Y') that describe a circle with the rotation of the direction-finding sensor through 360 degrees.

3. A direction finding system according to claim 2, wherein each of said 2N boundary functions is given by the following equation:

$$y_k = \tan\left(\frac{360°}{8N} + \frac{360°}{4N}(k-1)\right)Y' - X'$$

with respect to $k = 1 \ldots 2N$).

4. A direction finding system according to claim 2, wherein said function generator circuit generates boundary functions $y_1 = Y' - (\tan 67.5°)X'$, $y_2 = (\tan 67.5°)Y' - X'$, $y_3 = (\tan 67.5°)Y' + X'$ and $y_4 = Y' + (\tan 67.5°)X$.

5. A direction finding system according to claim 2, wherein said function generator circuit further generates four constants $\pm\tan 67.5°$ and $\pm(1/\tan 67.5°)$ and includes means for calculating $Y'/X'$ and means for comparing $Y'/X'$ with said four constants.

6. A direction finding system according to claim 2, wherein said function generator circuit generates boundary functions $y_1' = (\tan 22.5°)Y' - X'$, $y_2' = Y' - (-\tan 22.5°)X'$, $y_3' = Y' + (\tan 22.5°)X'$ and $y_4' = (\tan 22.5°)Y' + X'$.

7. A direction finding system according to claim 2, wherein said function generator circuit generates boundary functions $y_1 = Y' - (\tan 78.75°)X'$, $y_2 = Y' - (-\tan 56.25°)X'$, $y_3 = (\tan 56.25°)Y' - X'$, $y_4 = (\tan 78.75°)Y' - X'$, $y_5 = (\tan 78.75°)Y' + X'$, $y_6 = (\tan 56.25°)Y' + X'$, $y_7 = (\tan 56.25°)Y' + X'$ and $y_8 = (\tan 78.75°)Y' + X'$.

8. A direction finding system according to claim 1, wherein said electronic means includes means for converting the two electric signals generated by said magnetism sensor into components of said radialized boundaries, means for discriminating polarity of the converted signal components to produce discrimination output signals, latch means for temporarily storing the output signals, means for encoding output signals of said latch means into coded signals $A_0$, $B_0$, $C_0$, and decoder means for decoding the coded signals into the direction signal specifying a corresponding one of said 4N directions.

9. A direction finding system of the type displaying a present direction on a dial defining 4N direction indicating radialized regions by 2N radialized boundaries, where N is a positive integer, said system comprising a direction finding sensor for generating two periodical electric signals corresponding to two perpendicular components of the direction of the earth's magnetic field;

tuning and amplifying circuits for tuning and amplifying the electric signals to produce a pair of direction signals in a relation that their maximum values become equal with each other;

a discrimination circuit for producing first 2N binary signals indicating in sign whether the magnitude of the direction signals are larger or smaller than predetermined 2N boundary indicating levels which angularly define the 4N radialized regions;

latch circuits for generating and latching second direction indicating 2N binary signals respectively;

a decoding circuit for sorting the second 2N binary signals to generate one of 4N number of direction signals; and a display section for displaying any one of 4N directions in response to the generated signal of said sorting circuit.

* * * * *